(12) United States Patent
Sakai (10) Patent No.: US 7,797,535 B2
(45) Date of Patent: Sep. 14, 2010

(54) AUTHENTICATION METHOD AND SYSTEM, AND INFORMATION PROCESSING METHOD AND APPARATUS

(75) Inventor: Tatsuhiko Sakai, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1084 days.

(21) Appl. No.: 11/270,424

(22) Filed: Nov. 8, 2005

(65) Prior Publication Data

US 2006/0101280 A1    May 11, 2006

(30) Foreign Application Priority Data

Nov. 8, 2004    (JP) .............................. 2004-324075

(51) Int. Cl.
*H04L 9/32* (2006.01)

(52) U.S. Cl. ..................................... 713/168

(58) Field of Classification Search ................. 713/168
See application file for complete search history.

(56) References Cited

U.S. PATENT DOCUMENTS

| | | | |
|---|---|---|---|
| 6,826,690 B1* | 11/2004 | Hind et al. ................... | 713/186 |
| 7,281,729 B1* | 10/2007 | Wilson ....................... | 280/602 |
| 7,428,637 B1* | 9/2008 | Billman et al. .............. | 713/168 |
| 2001/0023487 A1* | 9/2001 | Kawamoto ................... | 713/202 |
| 2002/0087858 A1* | 7/2002 | Oliver et al. ................. | 713/156 |
| 2002/0138761 A1* | 9/2002 | Kanemaki et al. ........... | 713/201 |
| 2004/0128505 A1* | 7/2004 | Larsen ....................... | 713/169 |
| 2004/0242250 A1* | 12/2004 | Sasai et al. .................. | 455/502 |
| 2005/0283618 A1* | 12/2005 | Min ........................... | 713/182 |
| 2009/0077644 A1* | 3/2009 | Hammell et al. ............... | 726/7 |

FOREIGN PATENT DOCUMENTS

| | | |
|---|---|---|
| EP | 1 182 825 A2 | 2/2002 |
| EP | 1 335 563 A2 | 8/2003 |
| EP | 1 437 863 A1 | 7/2004 |
| JP | 2001-189722 | 7/2001 |
| JP | 2003-174468 | 6/2003 |
| WO | WO 02/03625 A1 | 1/2002 |

OTHER PUBLICATIONS

Communication from theEuropean Patent Office dated Feb. 23, 2006 and Search Report dated Feb. 13, 2006.

* cited by examiner

*Primary Examiner*—Kambiz Zand
*Assistant Examiner*—Teshome Hailu
(74) *Attorney, Agent, or Firm*—Cowan, Liebowitz & Latman, P.C.

(57) ABSTRACT

When having established communication with a data processing apparatus, a first apparatus determines whether or not to generate authentication information based on identification information about the data processing apparatus. If it is determined that generation of authentication information is necessary, then the first apparatus generates authentication information and saves it in a memory. If it is determined that generation of authentication information is necessary, the first apparatus sends the generated authentication information to the data processing apparatus with which communication has been established. If it is determined that generation of authentication information is unnecessary, then the first apparatus sends authentication information saved in the memory to the data processing apparatus with which communication has been established. Thereby, authentication between data processing apparatuses is performed with the use of the authentication information sent from the first apparatus.

14 Claims, 10 Drawing Sheets

AUTHENTICATION METHOD AND SYSTEM, AND INFORMATION PROCESSING METHOD AND APPARATUS

FIELD OF THE INVENTION

The present invention relates to an authentication technique for a communication system using wireless communication.

BACKGROUND OF THE INVENTION

With recent development of wireless communication techniques including WirelessLAN, it is being promoted to replace a part of a communication system using wired communication with a wireless communication system in home or office environments. For example, instead of connecting a notebook computer to a wired LAN network to perform communication by connecting a network cable with the notebook computer to connect to the network, connection may be made to a network via an access point with the use of WirelessLAN. As another example, instead of printing an image taken by a digital camera with a printer by connecting the digital camera and the printer via a USB cable or the like to transfer the image, the image may be transferred to the printer with the use of Bluetooth or WirelessLAN.

In addition to the purpose of replacing wired communication, there is great expectation for a close range wireless communication mode such as NFC (Near Field Communication). It is possible to perform communication between pieces of equipment provided with NFC only by bringing the pieces of equipment close to each other. Therefore, NFC has gotten attention as such as can provide a user with convenient means for easily utilizing various services in performing settlement processing, processing for accessing to services or the like.

From the above situation, it is anticipated that wireless communication such as WirelessLAN and NFC will further spread. That is, it is anticipated that, not only in homes and offices but also in every environment, a scene will be more often seen that various pieces of equipment provided with the above-described wireless communication mode perform communication so that a user can utilize various services.

In the case where many pieces of equipment can perform wireless communication as described above, it is essential to certainly grasp what kinds of equipment are connected to each network and perform authentication processing to avoid improper connection or connection from malicious equipment. For example, in a home environment, it must be avoided to wrongly connect to a printer of the next house when an image taken by a digital camera is printed. In an office environment, it is necessary to certainly perform authentication processing in connecting to an access point in order to prevent a malicious third person from invading an intranet.

For example, in IEEE 802.11, an authentication method utilizing a common key cryptography or an authentication method utilizing an authentication server such as RADIUS is used for such authentication processing. In Bluetooth, access control is performed by inputting a password such as a PIN code.

As described above, in an environment where wireless communication is widely and generally spread, it is necessary to prevent improper connection or invalid access by certainly performing authentication processing.

However, if consideration is given to authentication processing to be performed when portable terminals, such as a digital camera and a mobile printer provided with a wireless communication function, communicate with each other, the authentication methods described above are not necessarily suitable. For example, in general, a portable terminal does not have sufficient input means for authentication or is not provided with such input means at all. Accordingly, even if a user attempts authentication by inputting a password in such an environment, it may be very troublesome for the user to input the password, or input itself may be impossible. It is also impossible to use the method utilizing an authentication server in such an ad-hoc environment where a network is constituted only by terminals to perform communication, because there is not an authentication server on the network. Furthermore, it is also impossible for the method utilizing a common key cryptography to completely prevent access from those other than an authorized user, because security in key exchange is not specifically provided and, therefore, there is a possibility that a key may be obtained by a third person intentionally or by mistake.

In Japanese Patent Laid-Open No. 2001-189722 and in Japanese Patent Laid-Open No. 2003-174468, there is proposed an authentication system utilizing a card.

However, in such a system, it is possible for a third person to acquire information for authentication from each equipment by using an apparatus provided with a data reading/writing function equivalent to that of the card. Therefore, the system also cannot enable satisfactory security to be obtained.

SUMMARY OF THE INVENTION

The present invention has been made in consideration of the above problems, and its object is to make it possible to easily and certainly perform authentication processing without annoying a user with a troublesome work even in an environment where access to an authentication server is impossible due to insufficient user interface of a portable terminal.

In order to achieve the above object, according to one aspect of the present invention, there is provided an authentication method for performing authentication between data processing apparatuses, the method comprising: a determination step of, when communication is established with a data processing apparatus, determining whether or not generation of authentication information is necessary based on identification information about the data processing apparatus, in a first apparatus; a generation step of, if it is determined by the determination step that generation of authentication information is necessary, generating authentication information and saving the authentication information in a memory, in the first apparatus; a first sending step of, if it is determined by the determination step that generation of authentication information is necessary, sending the authentication information generated by the generation step to the data processing apparatus with which communication has been established, in the first apparatus; a second sending step of, if it is determined by the determination step that generation of authentication information is unnecessary, sending authentication information saved in the memory to the data processing apparatus with which communication has been established, in the first apparatus; and an authentication step of performing authentication between the data processing apparatuses with the use of the authentication information sent by the first sending step or the second sending step.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
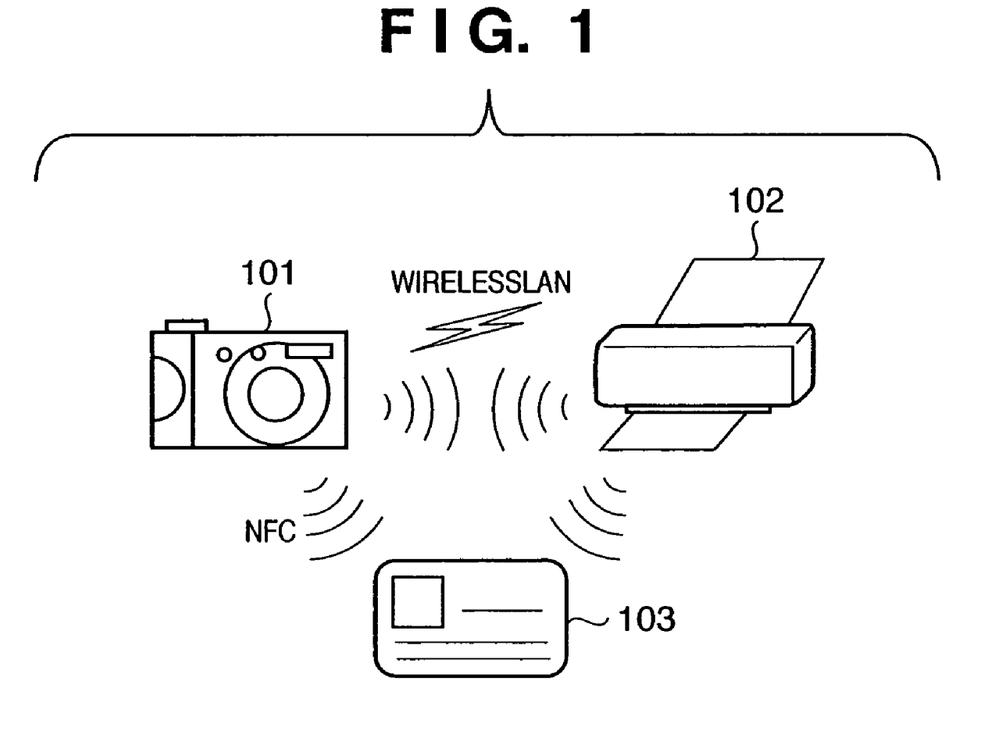
FIG. 1 shows an example of configuration of an authentication system according to this embodiment.

FIG. 1 shows the outline of configuration of a wireless system to which authentication processing according to a first embodiment is applicable. As shown in FIG. 1, the authentication processing of the first embodiment realizes authentication between an image capturing apparatus 101 and a printer 102 by causing an authentication card 103 to intervene therebetween. That is, in the wireless communication system of the first embodiment, the image capturing apparatus 101, the printer 102 and the authentication card 103 perform authentication processing utilizing close range wireless communication by means of NFC. Then, if the authentication processing succeeds and access is permitted, content data is communicated from the image capturing apparatus 101 to the printer 102 by means of WirelessLAN.

The configuration of the image capturing apparatus 101 in this embodiment will be described with the use of the functional block diagram shown in FIG. 2. The image capturing apparatus 101 is provided at least with a WirelessLAN communication section 201, an NFC reader/writer communication section 202, an authentication processing section 203, a storage section 204 and an image capturing processing section 205. The WirelessLAN communication section 201 has a function of performing wireless communication with neighbor terminals utilizing the WirelessLAN communication mode. The NFC reader/writer communication section 202 has a function of forming an RF field with an NFC tag or another NFC reader/writer communication section within the communication distance utilizing the NFC communication mode to send and receive data. The authentication processing section 203 has a function of accessing another apparatus (in this example, the printer 102) and performing authentication processing to perform WirelessLAN communication. The storage section 204 has a function of storing authentication information acquired from the outside (in this example, the authentication card 103). The image capturing processing section 205 has a function of performing processing related to image capturing, which is the main function of the image capturing apparatus 101.

Next, the configuration of the printer 102 in this embodiment will be described with the use of the functional block diagram shown in FIG. 3. The printer 102 is provided at least with a WirelessLAN communication section 301, an NFC reader/writer communication section 302, an authentication processing section 303, a storage section 304, a print processing section 305 and a timer section 306. The WirelessLAN communication section 301 has a function of performing wireless communication with neighbor terminals utilizing the WirelessLAN communication mode. The NFC reader/writer communication section 302 has a function of forming an RF field with an NFC tag or another NFC reader/writer communication section within the communication distance utilizing the NFC communication mode to send and receive data. The authentication processing section 303 has a function of performing authentication processing for a terminal requesting permission of WirelessLAN communication access. The storage section 304 has a function of storing identification information and authentication information to be acquired from the outside (in this example, the authentication card 103). The print processing section 305 has a function of performing processing related to printing, which is the main function of the printer 102. The timer section 306 has a function of monitoring the time limit of validity of authentication information stored in the storage section 304.

Next, the configuration of the authentication card 103 according to this embodiment will be described with the use of the functional block diagram shown in FIG. 4. The authentication card 103 is provided at least with an NFC tag communication section 401, an authentication information management section 402, an authentication information generation section 403 and a storage section 404. The NFC tag communication section 401 is activated by being supplied with power from an RF field formed between the NFC tag communication section 401 and an NFC reader/writer section within the communication distance, through electromagnetic induction. Then, the NFC tag communication section 401 performs communication by returning a response to a request from the NFC reader/writer section. The authentication information management section 402 has a function of performing authentication information sending processing in response to an authentication information request message. The authentication information generation section 403 generates authentication information. In this embodiment, the authentication information generation section 403 has a function of generating a random character string with several digits as the authentication information every time it is activated. Though a random character string with several digits is used as the authentication information in this embodiment, the data length and the data format are not limited thereto. That is, any data can be used as the authentication information if it can be communicated between terminals, stored in the storage section of each terminal and compared. The storage section 404 has a function of storing the authentication information generated by the authentication information generation section 403.

Figure 2:
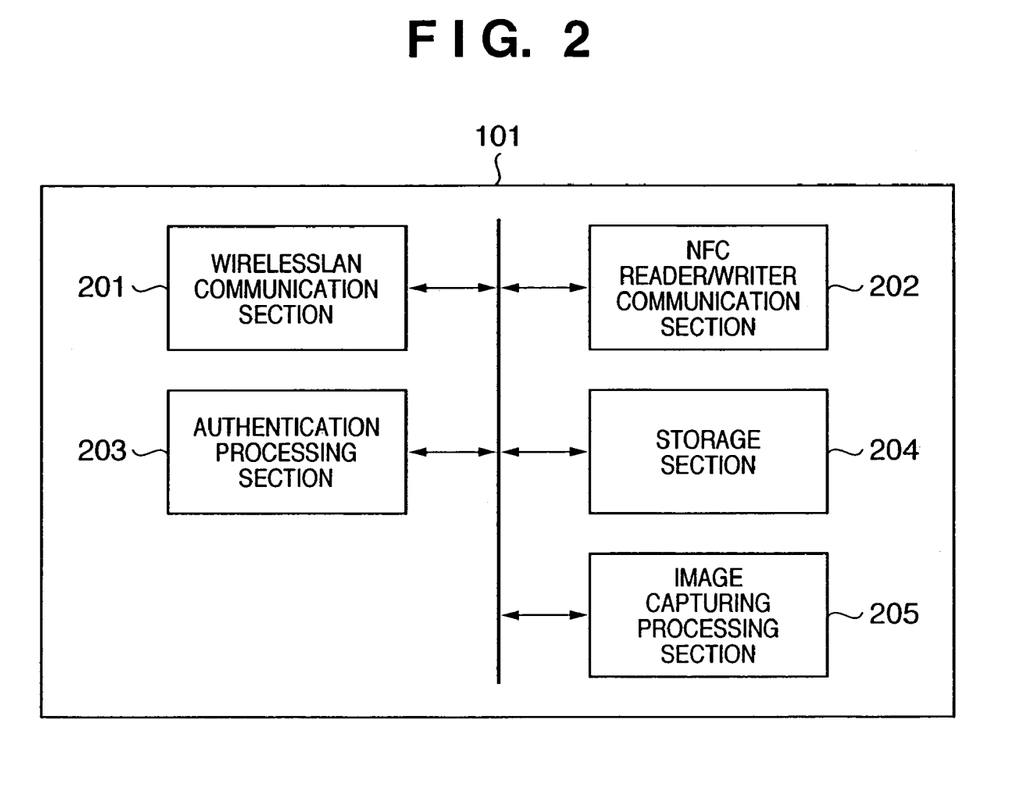
FIG. 2 is a block diagram showing functional configuration of an image capturing apparatus in the authentication system of this embodiment.
Figure 3:
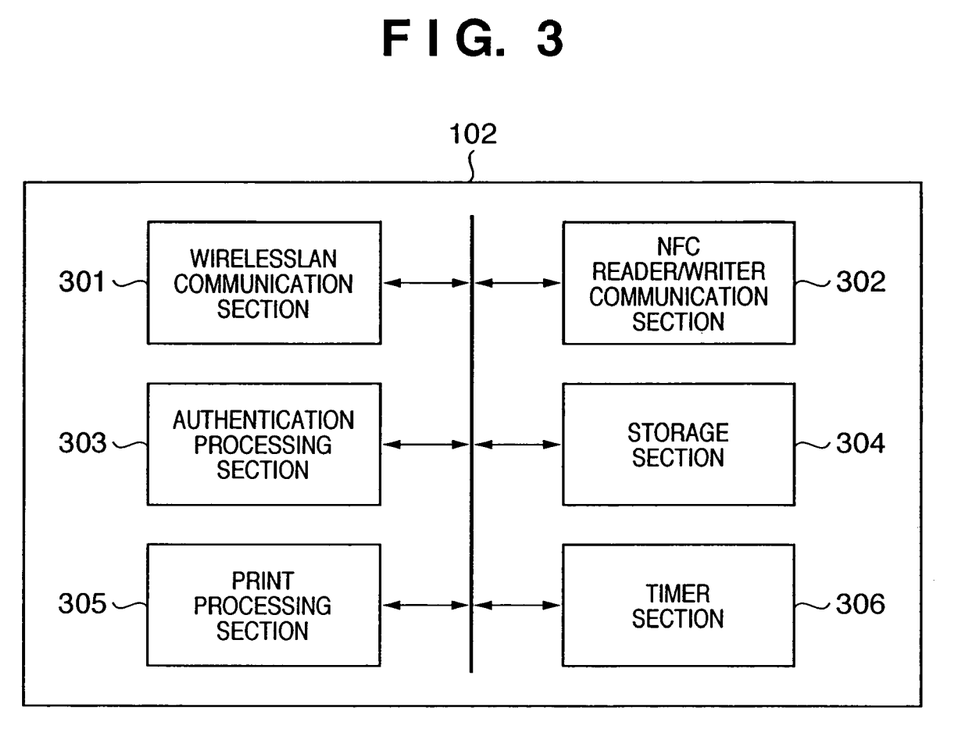
FIG. 3 is a block diagram showing functional configuration of a printer applicable to the authentication system of this embodiment.
Figure 4:
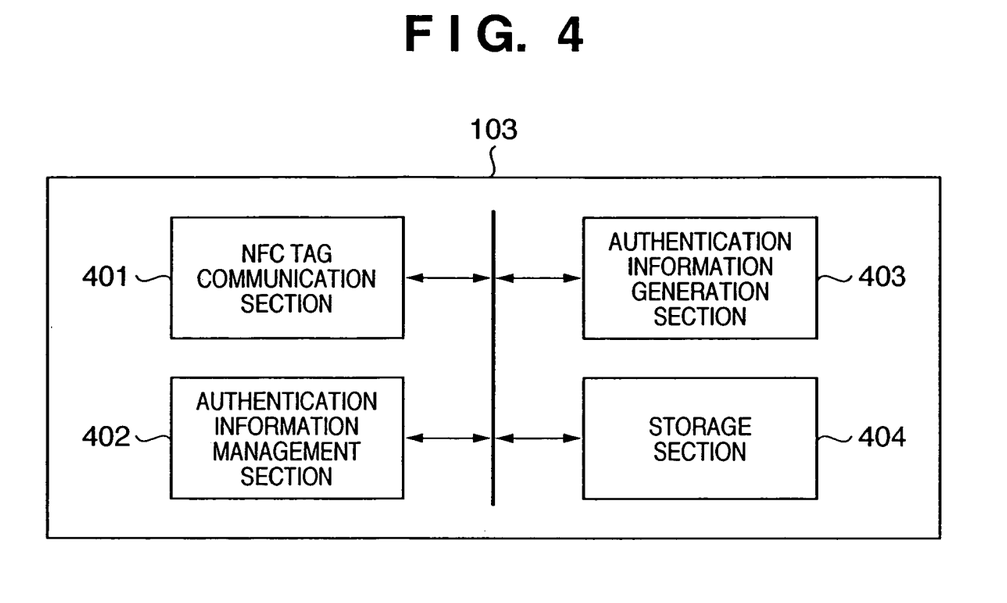
FIG. 4 is a block diagram showing functional configuration of an authentication card applicable to the authentication system of this embodiment.

The image capturing apparatus 101, the printer 102 and the authentication card 103 have hardware configuration for realizing the functional configuration shown in FIGS. 2 to 4, respectively. Such configurations, however, are apparent to those skilled in the art, and therefore, illustration by figures is omitted here. As an example of configuration of the WirelessLAN communication section, there is configuration for performing WirelessLAN communication in conformity with the IEEE 802.11 standard or the like. For configuration for performing NFC (202, 302 and 401), RFID (Radio Frequency Identification) can be used. Description will be made below on authentication processing to be performed when WirelessLAN communication is performed between the image capturing apparatus 101 and the printer 102.

Figure 5:
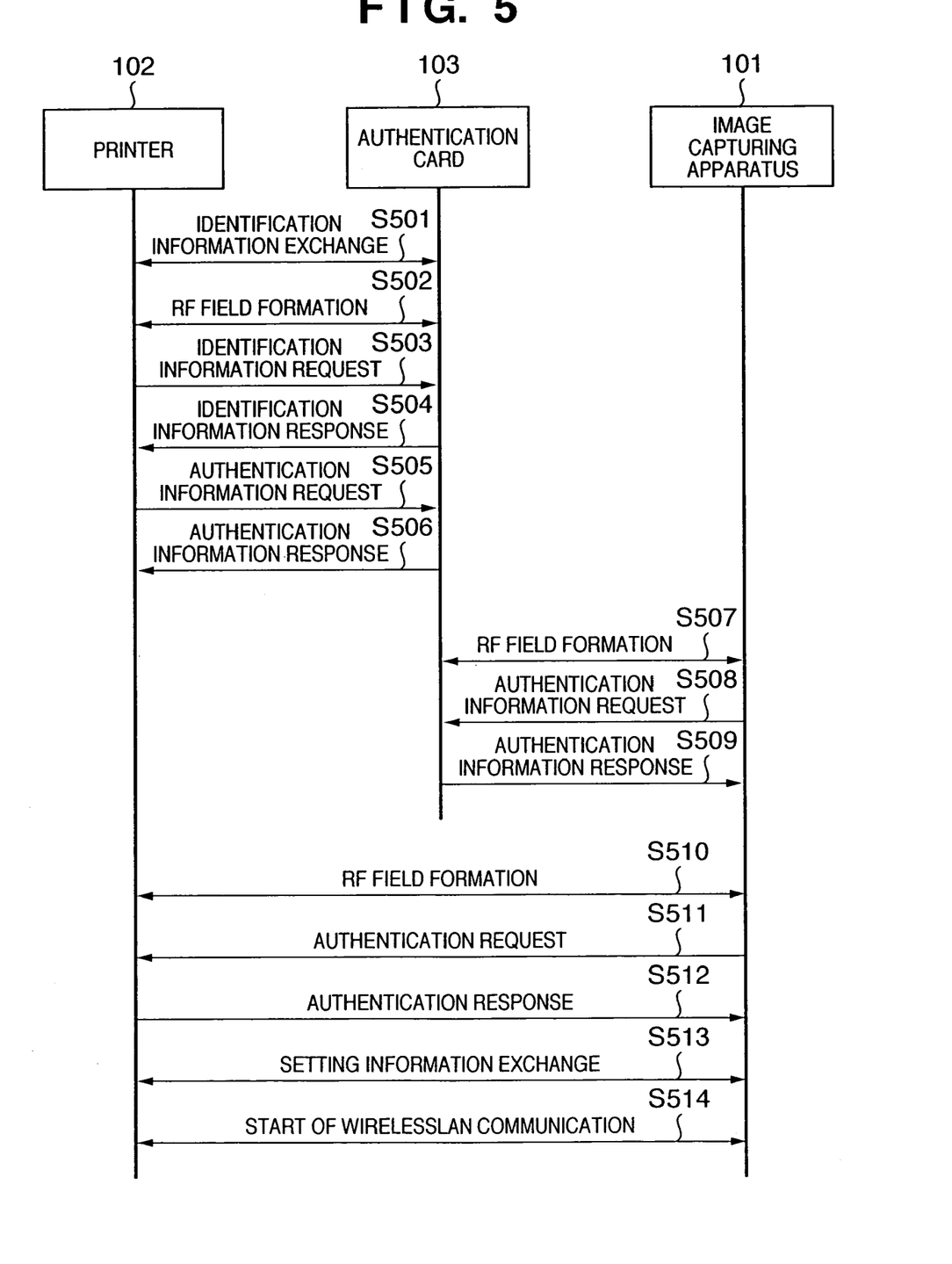
FIG. 5 is a sequence diagram showing a procedure for authentication processing in this embodiment.
Figure 8:
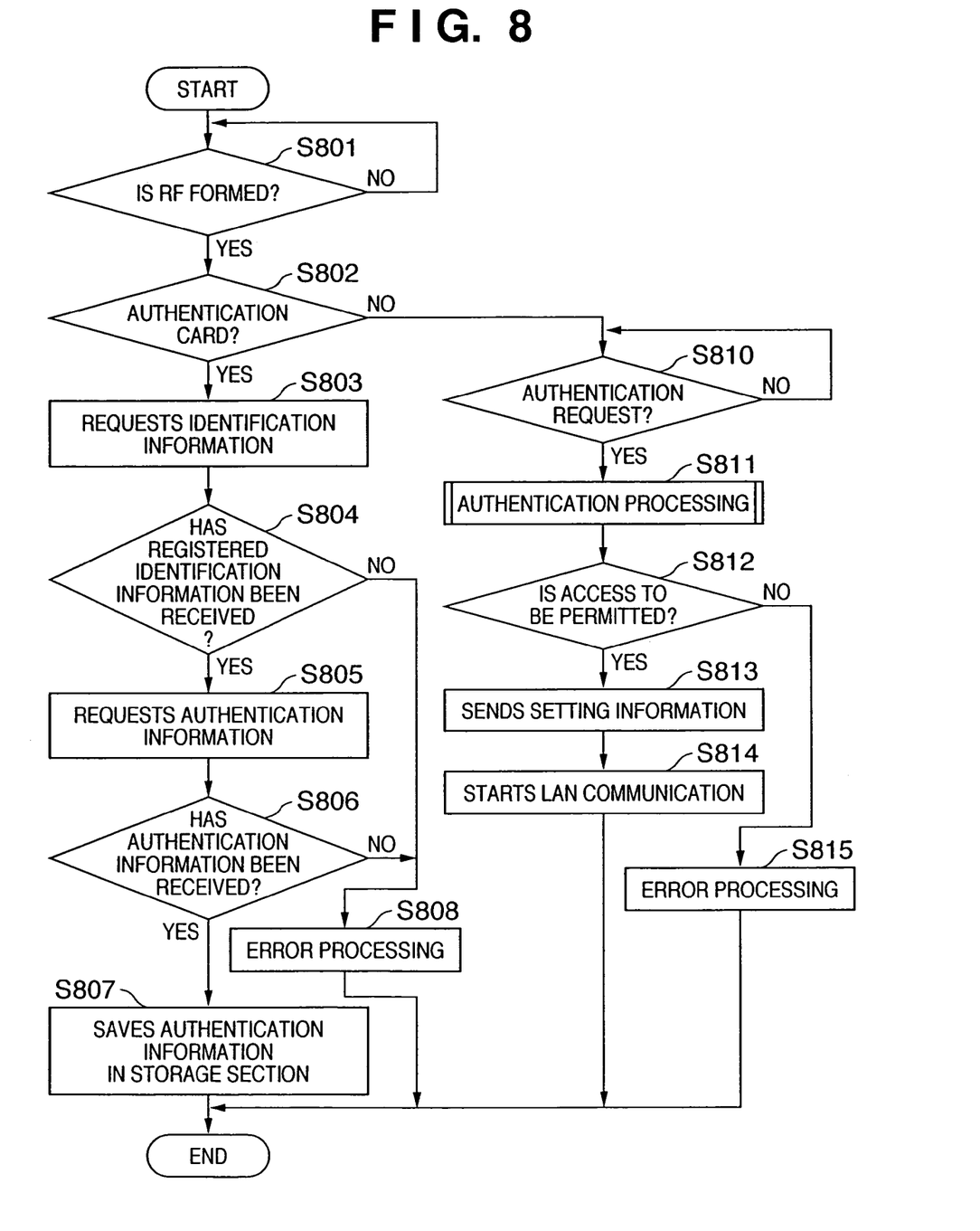
FIG. 8 is a flowchart illustrating the operation of the printer in the authentication processing.
Figure 9:
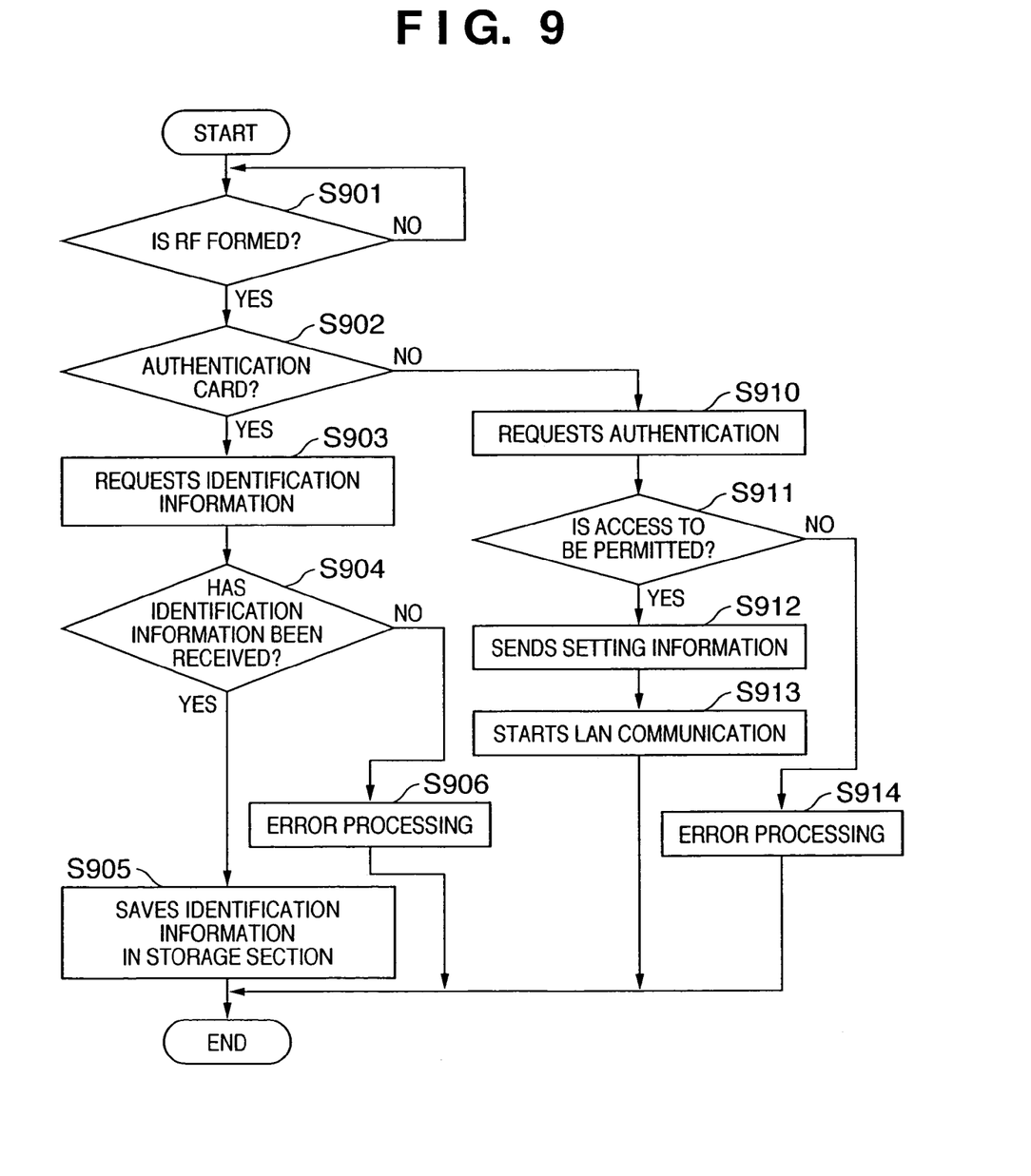
FIG. 9 is a flowchart illustrating the operation of the image capturing apparatus in the authentication processing.
Figure 10:
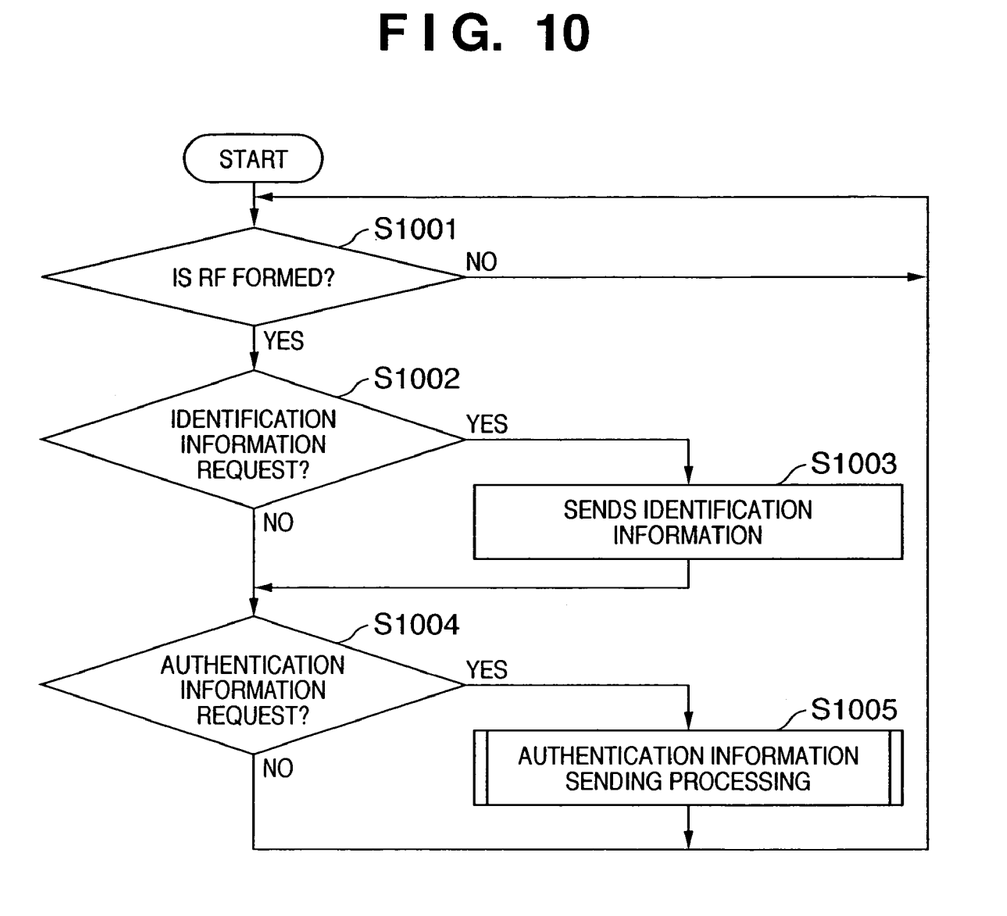
FIG. 10 is a flowchart illustrating the operation of the authentication card in the authentication processing.

Next, description will be made on the flow of processing by the authentication method according to the first embodiment with the use of FIG. 5 and FIGS. 8 to 10. FIG. 5 shows connection and information flow among the image capturing apparatus 101 as an apparatus which requests authentication, the printer 102 as an apparatus which confirms authentication and the authentication card 103 as an apparatus which provides authentication information. FIGS. 8, 9 and 10 are flowcharts illustrating the authentication processing operations of the printer 102, the image capturing apparatus 101 and the authentication card 103, respectively.

First, the printer 102 and the authentication card 103 perform processing for exchanging identification information and store identification information about the counterpart in their storage sections (304 and 404), respectively (step S501). This is called "pairing", which is performed to prevent authentication card spoofing in the authentication method described below. As the identification information, unique information which never overlaps with ID's of other equipment is used, such as a UUID (Universally Unique IDentifier). The following are possible methods for pairing (methods for causing the printer 102 and the authentication card 103 to store the identification information about the counterpart):

(1) A method in which an authorized user inputs the authentication information about the authentication card 103 from the operation section of the printer 102 for storage;

(2) A method in which the authentication information about the authentication card 103 is inputted into the printer 102 for storage by operating a computer connected to the printer 102 via a cable;

(3) A method in which the pieces of identification information are exchanged by operation by an authorized user, with the use of NFC communication; and (4) A method in which the identification information about the counterpart is written in the storage section before factory shipment.

Next, the authentication card 103 is brought close to the printer 102 until it is within the distance enabling NFC communication with the printer 102. Then, an RF field is formed between the authentication card 103 and the printer 102, and NFC communication is established and started (step S502). When NFC communication is started with the authentication card 103, the printer 102 sends a message requesting the identification information of the authentication card 103 to the authentication card 103 (step S503). In response to this request, the authentication card 103 sends its identification information to the printer 102 (step S504).

The printer 102 compares the acquired identification information of the authentication card 103 and the identification information stored in the storage section 304 to check whether the authentication card performing the NFC communication is the terminal which has performed the identification exchange processing (pairing) at step S501. If the pieces of identification information correspond to each other as a result of the comparison, then the printer 102 sends an authentication information request message including its identification information to the authentication card 103 (step S505). On the other hand, if the pieces of identification information do not correspond to each other, then the authentication processing is terminated. In this case, for example, a message representing the above status may be sent from the printer 102 to the authentication card 103, or the processing may be immediately terminated. If the printer 102 immediately terminates the processing, nothing is notified to the authentication card 103. However, the authentication card 103 can detect the termination of the processing from the fact that a predetermined time has elapsed without receiving a response since it sent its identification information response.

Having received the authentication information request message from the printer 102, the authentication card 103 performs authentication information sending processing to be described later to return a suitable authentication information response message to the printer 102 (step S506). That is, the authentication card 103 compares the identification information about the printer 102 included in the authentication information request message and the identification information stored in the storage section 404 to check whether the printer 102 is the terminal which has performed the identification information exchange processing at step S501. If the pieces of identification information correspond to each other as a result of the comparison, then the authentication information request is permitted, and the authentication card 103 generates authentication information, stores the authentication information in an authentication information response message and sends the message to the printer 102. If the authentication information is included in the received response message, the printer 102 stores the authentication information in the storage section 304. Here, the printer 102 activates the timer section 306 for saving authentication information, and discards the stored authentication information when the time limit of the timer comes. If the authentication information response message is an error, then the printer terminates the authentication processing.

Through the above-described processing from steps S501 to S506, the authentication information is sent from the authentication card 103 to the printer 102. Next, by the user bringing the authentication card 103 close to the image capturing apparatus 101 until it is within the distance enabling NFC communication, the authentication card 103 forms an RF field with the image capturing apparatus 101, and establishes and starts NFC communication (step S507). When NFC communication is started, the image capturing apparatus 101 sends an authentication information request message including its identification information to the authentication card 103 (step S508).

Receiving the authentication information request message from the image capturing apparatus 101, the authentication card 103 performs authentication information sending processing to be described later to return a suitable authentication information response message to the image capturing apparatus 101 (step S509). Here, the authentication card 103 compares the identification information about the image capturing apparatus 101 included in the authentication information request message and the identification information stored in the storage section 404. Then, according to the result of the comparison, the authentication card 103 includes the same authentication information as has been sent at step S506 in an authentication information response message and sends the message to the image capturing apparatus 101. If the authentication information is included in the received response message, the image capturing apparatus 101 stores the authentication information in the storage section 204. If the authentication information response message is an error, then the image capturing apparatus 101 terminates the authentication processing.

When sending of the authentication information to the printer 102 and the image capturing apparatus 101 is normally completed through the processing from steps S501 to S509, the common authentication information has been stored in the respective storage sections (204 and 304) of the image capturing apparatus 101 and the printer 102. After that, when the user brings the image capturing apparatus 101 close to the printer 102 until it is within the distance enabling NFC communication, an RF field is formed between the image capturing apparatus 101 and the printer 102, and NFC communication is established and started (step S510).

When communication is started at step S510, the authentication processing section 203 of the image capturing apparatus 101 reads the authentication information stored in the storage section 204 at step S509, and sends an authentication request message in which the read authentication information is stored to the printer 102 (step S511). Receiving the authentication request message from the image capturing apparatus 101, the authentication processing section 303 of the printer 102 performs authentication processing to be described later to determine whether or not access from the image capturing apparatus 101 should be permitted, and sends a suitable authentication response message to the image capturing apparatus 101 (step S512). When the authentication succeeds, the image capturing apparatus 101 and the printer 102 exchange setting information required for WirelessLAN communication, such as network identifiers (ESSID), encryption keys being communicated and information about the frequency channel to be used, through the NFC communication (step S513). Then, the image capturing apparatus 101 and the printer 102 utilize the setting information exchanged at step S513 to start WirelessLAN communication (step S514). On the other hand, if authentication fails, the authentication processing is terminated.

The image capturing apparatus 101 and the printer 102 perform the authentication processing in accordance with the above-described procedure. The operations of the printer 102, the image capturing apparatus 101 and the authentication card 103 in the above authentication processing will be described below with the use of the flowcharts in FIGS. 8 to 10, respectively.

In the printer 102, when an RF field is formed, the process proceeds from step S801 to step S802, where it is determined whether or not the connection destination is the authentication card 103. If the connection destination is the authentication card 103, then the process proceeds to step S803, where identification information is requested (S503). The identification information is received from the authentication card 103. If the identification information corresponds to registered identification information, then the process proceeds from step S804 to step S805, and authentication information is requested of the authentication card 103 (S504 and S505). Here, if the identification information cannot be received within a predetermined time, or if the received identification information does not correspond to the registered identification information, then the process proceeds to step S808. At step S808, corresponding error processing (for example, notification is made to notify that the pieces of identification information do not correspond to each other or the identification information has not been received) is performed, and the present processing is terminated.

If authentication information in response to the authentication information request is received, then the process proceeds from step S806 to step S807, and the authentication information is saved in the storage section 304 (S506). In the case where the authentication information cannot be received, such as the case where the authentication information cannot be received in a predetermined time or the case where an error message is received, the process proceeds from step S806 to step S808, where corresponding error processing (for example, notification of the content of the error) is performed, and the present processing is terminated.

If the connection destination is not an authentication card, then it is determined that the connection destination is an apparatus which requests authentication (in this example, the image capturing apparatus), and the process proceeds from step S801 to step S810 to wait for receiving an authentication request. When an authentication request is received (S510 and S511), authentication processing is performed at step S811 (to be described later with reference to FIG. 7) to determine whether or not access should be permitted. If access is permitted, then the process proceeds from step S812 to step S813, where permission of access is notified to the connection destination (S512), and the setting information required for WirelessLAN communication, which is stored in the storage section 304, is notified (S513). When the notification of the setting information for WirelessLAN ends, setting for the WirelessLAN communication section 201 is made based on the notified setting information, and the process proceeds to step S814, where WirelessLAN communication is started with the connection destination (S513 and S514). On the other hand, if access is refused, then the process proceeds from step S812 to step S815, where notification to that effect is made to the connection destination (S512), a message to that effect is displayed on the operation panel of the printer 102, and then the present processing is terminated.

Meanwhile, in the image capturing apparatus 101, when an RF field is formed, the process proceeds from step S901 to step S902, where it is determined whether or not the connection destination is the authentication card 103. If the connection destination is the authentication card 103, then authentication information is requested at step S903 (S507 and S508). If the authentication information is received, then the process proceeds from step S904 to step S905, the authentication information is saved in the storage section 204, and the processing is terminated (S509). If the authentication information cannot be received in a predetermined time, or if an error message is received, then the process proceeds from step S904 to step S906, where corresponding error processing (for example, notification of the content of the error) is performed, and the present processing is terminated.

If the connection destination is not the authentication card 103, then the process proceeds from step S902 to step S910. In this case, it is determined that the connection destination is an apparatus which performs authentication confirmation, and authentication is requested with the use of the authentication information saved in the storage section 204 (S510 and S511). Then, an authentication response is received from the connection destination, and the process proceeds from step S911 to step S912 if the response indicates permission of access. At step S912, the setting information required for WirelessLAN communication, which has been sent from the printer 102, is received and stored in the storage section 304, and setting is made for the WirelessLAN communication section 301 based on the stored setting information. When the setting has been made, the process proceeds to step S913, where LAN communication is started with the connection destination (S512 to S514). If an authentication response to the authentication request cannot be obtained, or if refusal of access is received as an authentication response, then the process proceeds from step S911 to step S914, where error processing corresponding thereto is performed (for example, the error is displayed on the display panel provided for the image capturing apparatus 101).

Meanwhile, in the authentication card 103, when an RF field is formed, the process proceeds from step S1001 to step S1002 and subsequent steps (S502 and S507). When an identification information request is received from a connection destination, the process proceeds from step S1002 to step S1003, where the identification information stored in the storage section 404 of the authentication card 103 is sent (S503 and S504). When an authentication information request is received, the process proceeds from step S1004 to step S1005, where authentication information sending processing to be described later is performed to send authentication information to the connection destination (S505, S506, S508 and S509).

Figure 6:
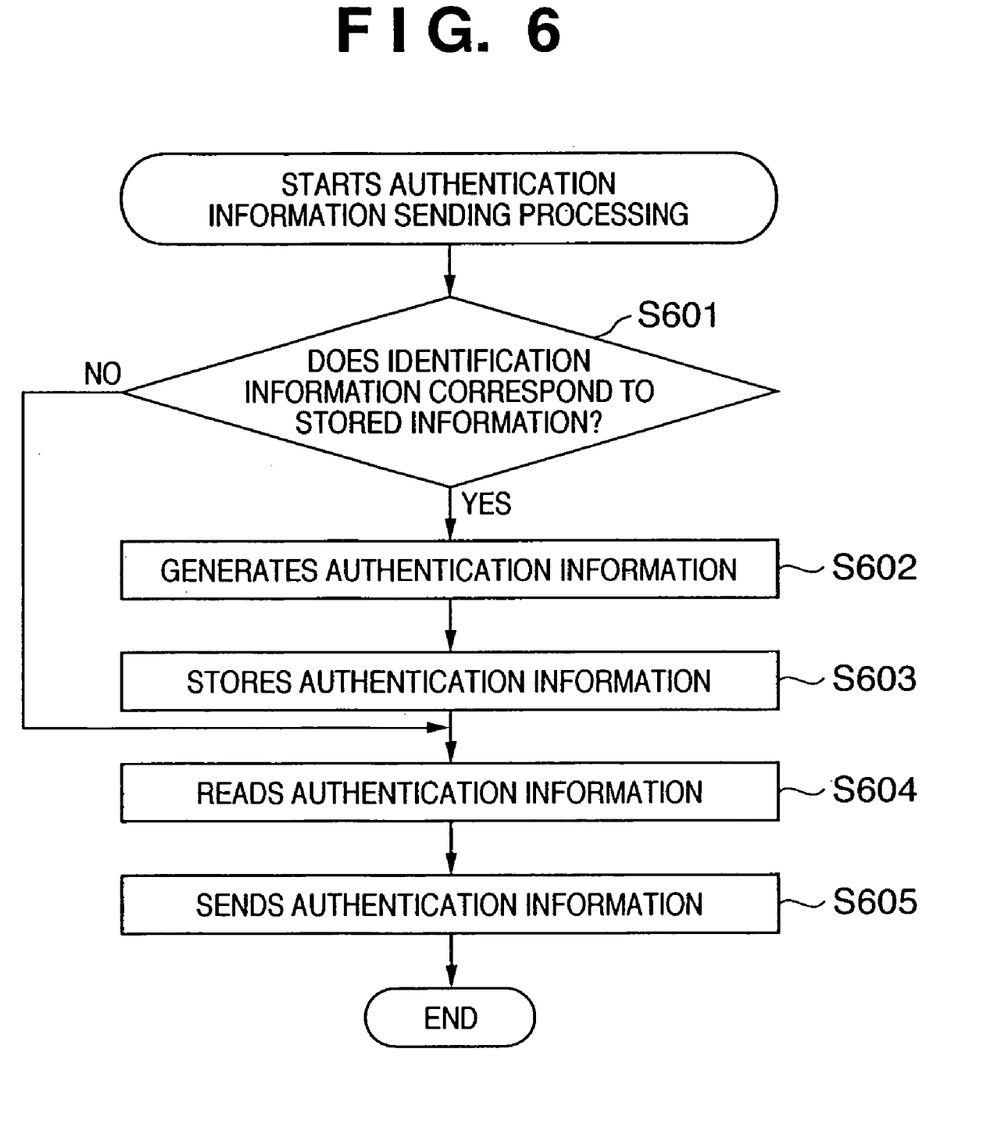
FIG. 6 is a flowchart showing a procedure for authentication information sending processing to be performed in the authentication card of this embodiment.

Next, description will be made on the authentication information sending processing (step S1005 in FIG. 10) at the above-described steps S506 and S509 to be performed in the authentication card 103, with the use of the flowchart in FIG. 6.

First, at step S601, it is determined whether or not the identification information included in the authentication information request message corresponds to the identification information stored in the storage section 404. If the pieces of identification information correspond to each other, the process proceeds to step S602. Otherwise, the process proceeds to step S604. Here, if the identification information included in the authentication information request message corresponds to the identification information stored in the storage section 404, then it is determined that the authentication information request message has been sent from an apparatus which performs authentication (in this example, the printer 102). In this case, at step S602 and subsequent steps, new authentication information is generated and returned to the requesting side. On the other hand, if the identification information included in the authentication information request message does not correspond to the identification information stored in the storage section 404, then it is determined that the authentication information request message has been sent from an apparatus which requests authentication (in this example, the image capturing apparatus 101). In this case, at step S604 and subsequent steps, authentication information which has already been generated and saved is returned to the requesting side. In other words, in the above-described processing, it is determined whether or not to generate authentication information, based on identification information included in an authentication information request, and authentication information is generated at step S602 if it is determined that the information should be generated. Accordingly, as for how identification information should be used to determine whether or not to generate authentication information, it is possible to make various changes.

At step S602, authentication information is generated by the authentication information generation section 403, and at step S603, the generated authentication information is stored in the storage section 404. At step S604, the authentication information stored in the storage section 404 is read, and at step S605, a response message in which the read authentication information is included is created and sent to the communication counterpart terminal.

According to the above-described processing, if an authentication information request message is received from the printer 102 with which identification information has been exchanged (S505), new authentication information is generated by the authentication information generation section 403. Then, this authentication information is notified to the printer 102 (the authentication information response at S506) and stored in the storage section 404. If an authentication information request message is received from the image capturing apparatus 101 with which identification information has not been exchanged (S508), the authentication information saved in the storage section 404 is simply read and notified to the image capturing apparatus 101 (the authentication information response at S509).

The printer 102 and the image capturing apparatus 101 which have received a response message by the authentication information response at the above-described steps S506 and S509 save authentication information included in the response message in the storage sections (304 and 204), respectively.

Figure 7:
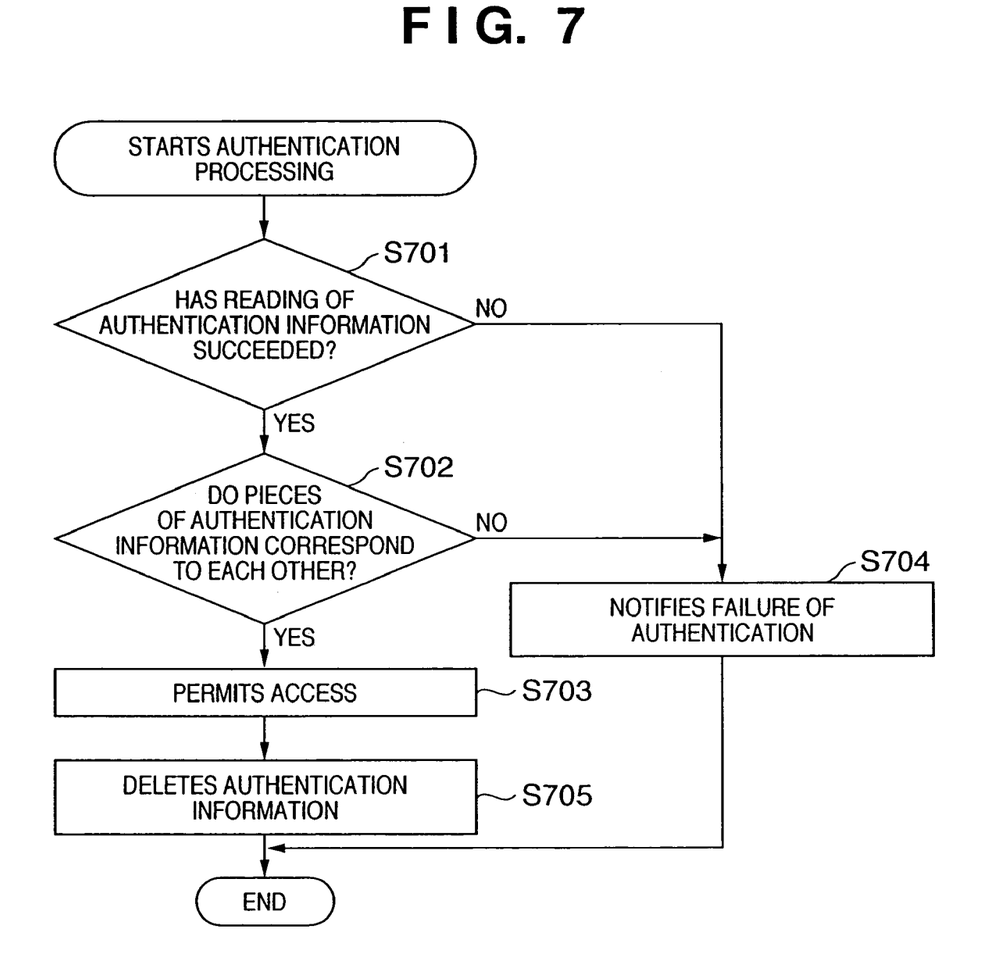
FIG. 7 is a flowchart showing a procedure for authentication processing in a printer of this embodiment, which is an apparatus to perform authentication.

Next, description will be made on the authentication processing (S811 in FIG. 8) to be performed by the printer 102 as an apparatus which performs authentication, for the authentication response at step S512, with the use of FIG. 7. The processing in FIG. 7 shows processing to be performed by receiving an authentication request message from the image capturing apparatus 101 as an apparatus which requests authentication.

When an authentication request message is received, it is determined first at step S701 whether or not authentication information is stored in the storage section 304. If the authentication information is stored in the storage section 304, then the process proceeds to step S702. On the other hand, if the authentication information is not stored in the storage section 304, then the process proceeds to step S704. The following are the reasons why the authentication information is not stored in the storage section 304:

(1) The printer 102 has not acquired the authentication information from the authentication card 103;

(2) The authentication information has been already deleted as used information at step S705 to be described later;

(3) The authentication information has been deleted because the time limit of the timer activated at step S506 came; and the like.

At step S702, authentication information stored in the authentication request message and the authentication information stored in the storage section 304 are compared to determine whether or not the pieces of authentication information correspond to each other. If both pieces correspond to each other, then the process proceeds to step S703 on the assumption that the authentication has succeeded. Otherwise, the process proceeds to step S704. At step S703, a response message which includes information indicating permission of access is sent to the terminal which sent the authentication request message. Then, the process proceeds to step S705, where the authentication information stored in the storage section 304 is deleted, and the processing is terminated.

If the authentication information is not stored in the storage section 304, or if the authentication information stored in the storage section 304 and the authentication information included in the authentication request message do not correspond to each other, then it is determined that authentication has failed. Accordingly, at step S704, information indicating refusal of access and a response message which includes the reason of the refusal of access, such as "no authentication information stored on the printer side" and "authentication information not corresponding to each other" is sent to the communication counterpart terminal, and the processing is terminated. In this case, a message to the effect that authentication has failed may be displayed on the operation panel of the printer 102.

When having formed an RF field with the printer 102, the image capturing apparatus 101 sends an authentication request message which includes the authentication information saved in its storage section 204 to the printer 102 and waits for an authentication result (permission of access or failure of authentication). If access is permitted, then setting information for WirelessLAN is exchanged with the printer 102, and connection for WirelessLAN communication is established. If failure of authentication is notified, a message to that effect may be displayed.

Through the above-described processing, the authentication processing between the image capturing apparatus 101 and the printer 102 is performed. Next, description will be made on how authentication fails if the user fails to perform operation in accordance with the procedure in FIG. 5.

For example, there may be a case where the user brings the authentication card 103 which has already exchanged identification information at step S501 close to the image capturing apparatus 101 before performing the authentication information sending processing with the printer 102, and performs the authentication information sending processing with the image capturing apparatus 101. In this case, the authentication information stored in the storage section 404 of the authentication card 103 is sent to the image capturing apparatus 101 in accordance with the above-described procedure in FIG. 6. However, this authentication information has been used for the previous authentication processing. Therefore, it is conceivable that the printer 102 discarded the authentication information at step S705 when the previous authentication processing succeeded or discarded it on the assumption that the time limit came based on the processing of the timer section 306 of the printer 102. Accordingly, in this case, when authentication is requested by bringing the image capturing apparatus 101 close to the printer 102, failure of authentication is notified at step S704 because authentication information has not been stored at step S701. In this case, an access refusal message may be sent which includes "no authentication information" as the reason of refusal. The image capturing apparatus 101, for which access has been refused, notifies the user that an error has occurred by displaying the reason of refusal on the operation screen or the like and that there is no authentication information in the printer 102. From this notification, the user can recognize that he should retry the authentication processing from step S502.

As another example, there may be a case where the user requests authentication by bringing the image capturing apparatus 101 close to the printer 102 without bringing the authentication card 103 close to the image capturing apparatus 101, after the authentication card 103 performs the authentication information sending processing with the printer 102 as the target. In this case, the authentication information generated at step S602 and sent at step S506 is not stored in the storage section 204 of the image capturing apparatus 101. That is, since correct authentication information is not stored, the pieces of authentication information do not correspond to each other at step S702, and failure of authentication is notified at step S704. In this case, an access refusal message may be sent which includes "authentication information not corresponding to each other" as the reason of refusal. The image capturing apparatus 101, for which access has been refused, notifies the user that an error has occurred by displaying the reason of refusal on the operation screen or the like. From this notification, the user can recognize that correct authentication information is not stored in the image capturing apparatus 101 and determine that he can retry the authentication processing from step S507.

In the above description, as an example of the exchange of setting information at step S513 in FIG. 5, setting information for WirelessLAN communication is sent from the printer 102 to the image capturing apparatus 101 so that the WirelessLAN setting for the printer 102 may be also made for the image capturing apparatus 101. However, the exchange is not limited thereto. The image capturing apparatus 101 may send setting information for WirelessLAN stored in the storage section 204 to the printer 102 so that the WirelessLAN setting for the image capturing apparatus 101 may be made for the printer 102.

As described above, according to the above-described embodiment, it is possible for a user to easily and certainly perform authentication processing only by simply bringing an authentication card close to an apparatus which performs authentication and an apparatus which requests authentication without performing troublesome work such as input of a password. Furthermore, according to the authentication method of this embodiment, it is possible to perform authentication processing without performing a procedure for connecting to an authentication server via an access point. Accordingly, it is possible to easily and certainly perform authentication processing even in an ad hoc communication environment where connection to infrastructure such as a base station and an access point is impossible. Furthermore, according to the authentication method of the above-described embodiment, it is possible to easily give access permission even to equipment that has not performed registration processing and the like while preventing spoofing or invalid access.

In the present invention, there is also included a case where software programs for realizing the functions of the embodiment described above (in the embodiment, programs corresponding to the flowcharts shown in the figures) are supplied to a system or an apparatus directly or remotely, and the computer of the system or the apparatus reads and executes the supplied program codes to achieve the functions of the embodiment described above.

Accordingly, the program codes themselves, which are to be installed in the computer to realize the functions and processing of the present invention by means of the computer, also realize the present invention. That is, the present invention includes the computer programs themselves which are for realizing the functions and processing of the present invention.

In this case, the computer programs may be in the form of object codes, programs to be executed by an interpreter, script data to be supplied to the OS or the like only if they have functions as a program.

As a recording medium for supplying the programs, there are, for example, a floppy® disk, hard disk, optical disk, magneto-optical disk, MO, CD-ROM, CD-R, CD-RW, magnetic tape, non-volatile memory card, ROM, DVD (DVD-ROM, DVD-R) and the like.

In addition, as another method for supplying the programs, it is also possible to connect to an Internet web page with the use of a browser of a client computer and download the computer programs of the present invention themselves or a compressed file including an automatic installation function from the web page to a recording medium such as a hard disk. Furthermore, it is also possible to divide the program codes of the programs of the present invention into multiple files so that each file may be downloaded from a different web page. That is, a WWW server which enables multiple users to download program files for realizing the functions and processing of the present invention with a computer is also included in the present invention.

Furthermore, it is also possible to encrypt the programs of the present invention, store them in a storage medium such as a CD-ROM and distribute the CD-ROM to users in order to enable a user who satisfies predetermined conditions to download key information for decryption from a web page via the Internet, use the key information to execute the encrypted programs, install them on a computer and realize them.

Furthermore, in addition to the case where the functions of the embodiment described above are realized by a computer executing the read programs, the functions of the embodiment described above can be realized by an OS or the like, which is operating on the computer, performing a part or all of the actual processing based on instructions of the programs.

Furthermore, the functions of the embodiment described above can be realized by the CPU provided for a feature expansion board inserted in a computer or a feature expansion unit connected to the computer performing a part or all of the actual processing based on instructions of the programs, which have been read from a recording medium and written in the memory provided for the feature expansion board or the feature expansion unit.

According to the present invention, it is possible to easily and certainly perform authentication processing without annoying a user with troublesome work even in an environment where access to an authentication server is impossible due to insufficient user interface of an apparatus.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-324075 filed on Nov. 8, 2004, which is hereby incorporated by reference herein.

What is claimed is:

1. An authentication method for performing authentication between a first apparatus and a second apparatus using a third apparatus, the method comprising:
    generation step in which the third apparatus generates authentication information and saves the generated authentication information in a memory in response to verification of identification information of an external apparatus obtained from the external apparatus when the third apparatus established a communication with the external apparatus;
    a first sending step in which, if the third apparatus establishes a communication with the first apparatus and authentication information is generated in the generation step in response to verification of identification information of the first apparatus, the third apparatus sends the generated authentication information to the first apparatus to make the first apparatus save the sent authentication information;
    a second sending step in which, if the third apparatus establishes a communication with the second apparatus and authentication information is not generated in the generation step in response to verification of identification information of the second apparatus, the third apparatus sends the authentication information, that has been already generated and saved in the memory, to the second apparatus to make the second apparatus save the sent authentication information; and
    an authentication step in which an authentication is performed between the first apparatus and the second apparatus, using the authentication information saved into the first apparatus in the first sending step and the authentication information saved into the second apparatus in the second sending step, when the first apparatus directly establishes a communication with the second apparatus without the third apparatus.

2. The method according to claim 1, further comprising steps in which:
    the first apparatus and the second apparatus set a setting information for a wireless communication, when the authentication is successful, and performs wireless communication between the first apparatus and the second apparatus by using the setting information.

3. The method according to claim 1, further comprising a step in which:
    the first apparatus invalidates the authentication information after a predetermined period.

4. The method according to claim 1, further comprising a step in which:
    the first apparatus invalidates the authentication information when the authentication is successful.

5. The method according to claim 1, wherein the third apparatus generates authentication information if identification information of apparatus establishing the communication is an identification information registered into the third apparatus.

6. The method according to claim 1, wherein
    the third apparatus establishes the communication with the first apparatus and the second apparatus by near field communication.

7. The method according to claim 2, wherein
    the wireless communication by the setting information is a wireless LAN communication.

8. An information processing method for providing authentication information to external apparatuses by an information processing apparatus, the authentication information being used for performing an authentication between the external apparatuses when the external apparatuses directly establish a communication with each other, the method comprising the steps of:
    a generating step of generating authentication information in response to verification of identification information of the external apparatus obtained from the external apparatus when the information processing apparatus establishes a communication with the external apparatus;
    a saving step of saving the authentication information generated in the generating step in a memory;
    a first sending step of sending the authentication information generated in the generating step to a first external apparatus to make the first external apparatus save the sent authentication information, if authentication information is generated in the generation step in response to verification of identification information of the first external apparatus obtained from the first external apparatus when the information processing apparatus establishes a communication with the first external apparatus; and
    a second sending step of sending authentication information that has been saved in the memory in the saving step to a second external apparatus to make the second external apparatus save the sent authentication information without generating authentication information, if authentication information is not generated in the generation step in response to verification of identification information of the second external apparatus obtained from the second external apparatus when the information processing apparatus establishes a communication with the second external apparatus.

9. The method according to claim 8, wherein
the communication established with the first and second external apparatus is near field communication.

10. An information processing method for performing authentication in communicating with an external apparatus by an information processing apparatus, the method comprising:
  a first acquisition step of establishing communication with a first external apparatus and acquiring, if identification information of the first external apparatus obtained from the first external apparatus has been already stored in the information processing apparatus, authentication information for authenticating an external apparatus from the first external apparatus and saving the authentication information in a memory;
  a second acquisition step of establishing communication with a second external apparatus and acquiring authentication information from the second external apparatus;
  an authentication step of authenticating the second external apparatus by using the authentication information acquired and saved in the memory at the first acquisition step and the authentication information acquired at the second acquisition step; and
  a discard step of discarding the authentication information saved in the memory at the first acquisition step when the authentication in the authentication step succeeded and the information processing apparatus permit an access with the second external apparatus.

11. The method according to claim 10, wherein
the communication established at the first acquisition step and the second acquisition step is near field communication.

12. An authentication system for performing authentication between a first apparatus and a second apparatus using a third apparatus,
  said third apparatus comprising:
  a generation unit configured to generate authentication information and save the generated authentication information in a memory in response to verification of identification information of an external apparatus obtained from the external apparatus when the third apparatus establishes a communication with the external apparatus;
  a first sending unit configured to send the generated authentication information to the first apparatus to make the first apparatus save the sent authentication information, if the third apparatus establishes a communication with the first apparatus and authentication information is generated by the generation unit in response to verification of identification information of the first apparatus; and
  a second sending unit configured to, if the third apparatus establishes a communication with the second apparatus and authentication information is not generated by the generation unit in response to verification of identification information of the second apparatus, send the authentication information that has been generated and saved in the memory to the second apparatus to make the second apparatus save the sent authentication information,
  wherein an authentication between the first apparatus and the second apparatus is performed using the authentication information saved into the first apparatus and the authentication information saved into the second apparatus, when the first apparatus directly establishes a communication with the second apparatus.

13. An information processing apparatus for providing authentication information to external apparatuses, the authentication information being used for performing an authentication between the external apparatuses when the external apparatuses directly establish a communication with each other, the apparatus comprising:
  a generating unit configured to generate authentication information in response to verification of identification information of the external apparatus obtained from the external apparatus when the information processing apparatus establishes a communication with the external apparatus;
  a saving unit configured to save the authentication information generated by said generating unit in a memory;
  a first sending unit configured to send the authentication information generated by said generating unit to a first external apparatus to make the first external apparatus save the sent authentication information, if authentication information is generated by the generating unit in response to verification of identification information of the first external apparatus obtained from the first external apparatus when the information processing apparatus establishes a communication with the first external apparatus; and
  a second sending unit configured to send authentication information that has been already saved in the memory by the saving unit, when the information processing apparatus establishes a communication with the first apparatus, to a second external apparatus to make the second external apparatus save the sent authentication information without generating authentication information, if authentication information is not generated by the generation unit in response to verification of identification information of the second external apparatus obtained from the second external apparatus when the information processing apparatus establishes a communication with the second external apparatus.

14. An information processing apparatus which performs authentication in communicating with an external apparatus, said information processing apparatus comprising:
  a first acquisition unit configured to establish communication with a first external apparatus and, if identification information of the first external apparatus obtained from the first external apparatus is already stored in the information processing apparatus, acquire authentication information for authenticating an external apparatus from the first external apparatus and save the authentication information in a memory;

a second acquisition unit configured to establish communication with a second external apparatus and acquire authentication information from the second external apparatus;

an authentication unit configured to perform authenticating the second external apparatus by using the authentication information acquired and saved in the memory by the first acquisition unit and the authentication information acquired by said second acquisition unit; and a discard unit configured to discard the authentication information saved in the memory by the first acquisition unit when the authentication by said authentication unit and the information processing apparatus permit an access with the second external apparatus.

* * * * *